United States Patent [19]

Cooperman

[11] 4,181,886
[45] Jan. 1, 1980

[54] DISTRIBUTION CONTROL UNIT PROVIDING SIMULTANEOUS HYBRID FDMA AND SS-TDMA OPERATION IN A TRANSITIONAL SATELLITE SWITCHED SYSTEM

[75] Inventor: Richard S. Cooperman, Silver Spring, Md.

[73] Assignee: Communications Satellite Corporation, Washington, D.C.

[21] Appl. No.: 826,625

[22] Filed: Aug. 22, 1977

[51] Int. Cl.² .......................................... H04B 7/185
[52] U.S. Cl. .............................. 325/4; 343/100 ST; 343/100 CS
[58] Field of Search .................... 325/1, 3, 4; 343/100 ST, 100 CS, 176, 178, 204; 333/7 D, 84 M; 179/18 GE, 18 GF, 15 AT, 18 BC, 1 CN

[56] References Cited
U.S. PATENT DOCUMENTS

| | | | |
|---|---|---|---|
| 3,711,855 | 1/1973 | Schmidt | 343/100 ST |
| 3,813,497 | 5/1974 | Wachs | 178/18 GF |
| 3,833,866 | 9/1974 | Boutelant | 333/7 D |
| 3,842,350 | 10/1974 | Gross | 325/4 |
| 3,928,804 | 12/1975 | Schmidt | 325/4 |
| 4,004,098 | 1/1977 | Shimasaki | 325/4 |

Primary Examiner—Robert L. Griffin
Assistant Examiner—Michael A. Masinick
Attorney, Agent, or Firm—Sughrue, Rothwell, Mion, Zinn and Macpeak

[57] ABSTRACT

An SS-TDMA satellite system providing uplink and downlink interconnections through an on-board microwave switching matrix controlled by an on-board distribution control unit responsive to ground command signals. The distribution control unit is configured to permit both point-to-point and point-to-multipoint interconnections of uplinks to downlinks through the switching matrix. Point-to-point interconnections under system static mode control may be effected simultaneously with point-to-point interconnections under system dynamic mode control.

3 Claims, 3 Drawing Figures

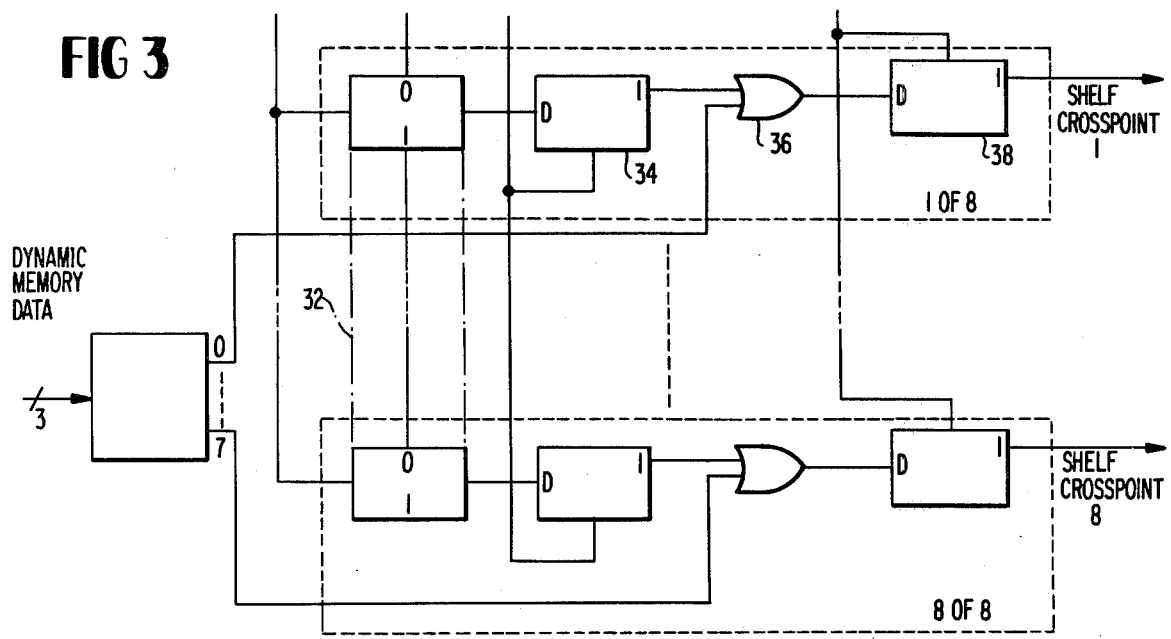

DISTRIBUTION CONTROL UNIT PROVIDING SIMULTANEOUS HYBRID FDMA AND SS-TDMA OPERATION IN A TRANSITIONAL SATELLITE SWITCHED SYSTEM

BACKGROUND OF THE INVENTION

1. Field of the Invention

The invention is generally in the field of communication satellites and more specifically relates to on-board satellite switched multiple access systems.

2. Description of the Prior Art

Present commercial communications satellites function as multiple access microwave repeaters for interconnecting communications signals between several earth stations. As presently constituted, communication satellites use a global coverage antenna common to multiple transponders, each comprised of a receiver and a transmitter. Generally, frequency modulated communications signals are transmitted between the earth stations and the satellite using frequency division multiple access, FDMA. FDMA grants the satellite the opportunity to simultaneously carry several channels of information. Channels are defined by frequencies and the number of channels which can be carried is limited to the frequency spectrum allocated to the satellite system. At present, satellite systems are constrained to a 500 MHz band.

Space division multiplexing, SDMA, is a known technique for expanding the available number of communications channels. In an SDMA system, narrow beam, directional antennas, known as spot beam antennas, are dedicated to specific geographical zones, with one or more earth stations being assigned to each zone. For each geographical zone, there is an uplink with its corresponding satellite on-board spot beam receive antenna and a downlink with its corresponding satellite on-board spot beam transmit antenna. A transponder is provided for each common zone uplink and downlink antenna pair. While the uplink and downlink for a geographical zone may be served by separate receive and transmit spot beam antennas, a single spot beam antenna can replace the two separate antennas. When a single spot beam antenna is used, the uplink and downlink signals are distinguished using conventional diversity techniques such as frequency or polarization diversity.

In the simplest form of an SDMA system, the interconnections between uplinks and the downlinks are fixed. Considering four uplinks A, B, C and D and four downlinks W, X, Y and Z, a fixed interconnection system would have, for example, uplink A connected to downlink W, uplink B connected to downlink X, uplink C connected to downlink Y and uplink D connected to downlink Z.

Greater flexibility is achieved if the interconnections between uplinks and downlinks can be varied at will. Such an arrangement, known as a satellite switched multiple access system is described in U.S. Pat. No. 3,711,855 to Schmidt et al, issued Jan. 16, 1973 and U.S. Pat. No. 3,928,804 to Schmidt et al, issued Dec. 23, 1975. Such satellite systems operate in time division multiple access, TDMA, and are thus denoted SS-TDMA systems, meaning satellite switched, time division multiple access systems.

In an SS-TDMA system, the uplinks are selectively connected to each of the downlinks through a matrix of microwave switches. An example of such a microwave switch is described in U.S. Pat. No. 3,813,497 to Wachs, issued May 28, 1974. Each uplink is connected to a row of switching elements, such as PIN diodes, with each diode in a row being connected via matrix columns to a downlink. The earth stations are operated in a time division mode sending their communications signals to the satellite in designated time slots in accordance with the signal destinations. Earth station transmissions are synchronized to the satellite on-board switching of the matrix crosspoint switching elements so that communications signals from the earth stations are directed to the proper downlinks.

Conventional SS-TDMA systems are designed for international telecommunications requirements where point-to-point interconnections are needed. Point-to-point means that at any moment each uplink communications signal connects to a single downlink. That is, at any moment in time, only one crosspoint for each row may be conductive. This arrangement distinguishes from the broadcast concept of earth station interconnection through a satellite link. Under the broadcast concept, also referred to as point-to-multipoint communication, an earth station communicates with several other earth stations simultaneously. In what is known as FM/TDMA systems, broadcast-type interconnections are easily effected since global coverage antennas are used. Each earth station may simultaneously receive and recognize all satellite relayed signals, since these signals, which are transmitted by global coverage antennas, are frequency discriminated. A similar broadcast capability is inherent in TDMA systems using global coverage antennas. However, once the satellite is configured to operate in the SS-TDMA mode by providing the satellite with spot beam antennas, known switching systems preclude broadcast interconnection since only point-to-point interconnection is feasible.

At the present, operational satellites function in the FM/FDMA mode. TDMA satellites are planned for the future, with TDMA satellite technology presently available. While future satellites will in all likelihood operate in the SS-TDMA mode, an interim or transitional period is expected where satellites will be required to provide both FDMA and TDMA capabilities along with both broadcast, i.e., point-to-multipoint, and point-to-point operation.

SUMMARY OF THE INVENTION

An SS-TDMA satellite is configured to allow both point-to-point and point-to-multipoint interconnections between the uplinks and downlinks. The satellite includes a conventional microwave switching matrix controlled by a distribution control unit. The distribution control unit generates control signals to selectively and simultaneously energize one or more of the switching elements in each row of the matrix. Point-to-point interconnections are generally provided while the system operates in its dynamic mode. In the dynamic mode, the distribution control unit cyclically generates control signals dictating the conductive states of the switching elements. A complete switching cycle takes place over each communication frame which is in the approximate range of from 1 to 10 milliseconds. Point-to-multipoint interconnections takes place in a static mode. By static mode it is meant that the conductive states of the switching elements are changed at a relatively infrequent rate, such as, once a month. While the dynamic mode allows for normal SS-TDMA operation, the static mode provides broadcast capabilities for FM/FDMA operations.

BRIEF DESCRIPTION OF THE DRAWINGS

FIG. 3 is a schematic diagram of a static control unit of FIG. 2.

DESCRIPTION OF THE PREFERRED EMBODIMENT

Figure 1:
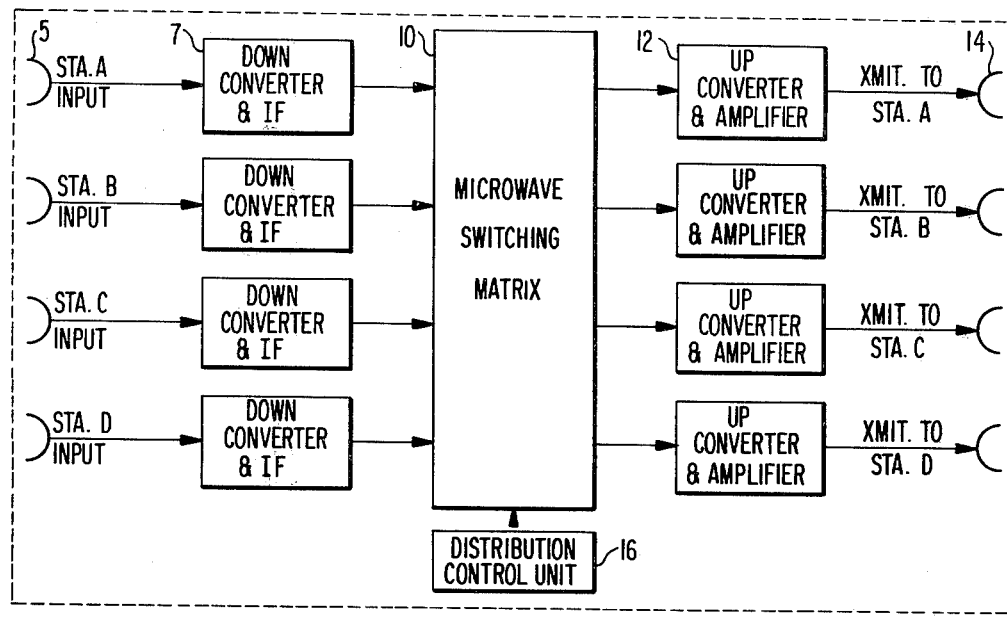
FIG. 1 is a block diagram of a conventional satellite switched multiple access communication satellite system employing on-board satellite switching under the control of a distribution control unit.

The basic SS-TDMA communications satellite system is illustrated in FIG. 1. In this illustration, a single earth station serves each geographical zone with an uplink and a downlink associated with each zone. Each uplink is provided with a spot beam receive antenna, while each downlink is provided with a separate downlink transmit antenna. It is to be understood, that a single spot beam antenna may serve both the uplink and the downlink for a given geographical zone by providing a means for distinguishing between the uplink and the downlink signals. Frequency diversity, phase diversity or polarization diversity may be used to provide the necessary distinctions. Further, it is to be understood that several earth stations may be located in a single geographical zone, with the several earth stations in a zone sharing the common uplink and downlink in a time division manner.

In operation of the SS-TDMA satellite system, an earth station communicates with the satellite over an uplink and a downlink. At the satellite, a spot beam receive antenna and a spot beam transmit antenna, which may be one in the same antenna, is dedicated to each geographical zone. Each of the earth stations A, B, C and D can have the capability of transmitting in either FDMA or TDMA. Regardless of the mode of transmission, each earth station transmits uplink signals to its respective spot beam receive antenna. These uplink signals are connected through appropriate signal conditioning circuits 7 such as down frequency converters and IF circuitry, to the microwave switching matrix 10. The microwave switching matrix comprises a series of signal conductive paths arranged in rows and columns with each row being selectively, electrically connected to each column at the matrix crosspoints by means of suitable switching elements such as PIN diodes. As previously noted, a suitable switching matrix is disclosed in U.S. Pat. No. 3,813,497 to Wachs. Another suitable matrix is illustrated in U.S. Pat. No. 3,833,866 to Boutelant, issued Sept. 3, 1974. The Boutelant matrix array is arranged in a shelf configuration wherein each row of crosspoint diodes are situated in a separate shelf, each shelf lying in a separate plane. Thus, each matrix row is designated by a separate shelf. Hereinafter, the term shelf will be used interchangeably with the word row in relation to the microwave switching matrix. The matrix outputs are directed to the downlinks through suitable signal conditioning circuits 12, such as up-frequency converters and amplifiers, and spot beam transmit antennas 14.

The conductive states of the switching diodes are controlled by a distribution control unit 16 termed herein DCU. The control signals from the DCU determine the sequence and duration of connections between the inputs and outputs of the matrix 10. When operating in TDMA, the dynamic switching of the microwave switching matrix is divided into repetitive frame intervals in the approximate range 1–10 milliseconds in duration. Each frame is further divided into time intervals termed frame units. A frame unit is the shortest programmable increment of time to be allocated to any particular cross connection of the satellite switching matrix and may be equal to approximately 6 microseconds in duration. The number of frame units allocated to any particular cross connection is under the control of the DCU 16. Generally, one less than the total number of frame units in every frame are allocated to communications signals. The remaining single frame unit in each frame is allocated for transmission of synchronizing signals to the earth stations. A synchronizing technique and apparatus which may be used with the system of the present invention is disclosed in the aforementioned U.S. Pat. No. 3,711,855.

Figure 2:
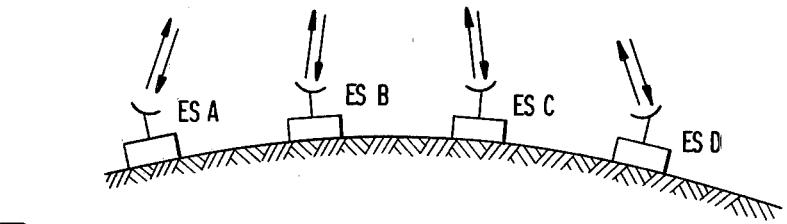
FIG. 2 is a block diagram of an improved distribution control unit according to the teachings of the present invention.

FIG. 2 is a functional block diagram of a distribution control unit, DCU, of the present invention. The DCU can be configured for redundancy as illustrated. Functional redundancy is accomplished by partitioning the DCU into two functional components. The interface/memory chips $A_1$ and $A_2$ are identical and provide control redundancy. Each of the chips $A_1$ and $A_2$ includes a control memory 20 connected with the controlling earth station through the telemetry and telecommand, T and C, interface 22. The T and C interface 22 permits the memory 20 to receive new interconnection patterns and to echo these back to the earth stations for verification. For explanatory purposes it will be assumed that each frame is comprised of 125 frame units. It is to be understood that a frame may be divided into any other number of frame units. The actual number of frame units will depend upon the basic SS-TDMA configuration. For 125 frame units per frame, each memory 20 stores 125 control words, one for each frame unit. For an 8 by 8 microwave switching matrix, each control word may be 24 bits long. This allows the generation of the 64 separate control words required to interconnect the 64 crosspoints and 125 patterns of signals required for the sequencing over each complete frame. The 24 bits of each word are organized in 8 by 3 bit groups with each 3-bit group uniquely selecting one switch from a particular shelf. For the purposes of explaining the invention described herein, an 8 by 8 switching matrix will be assumed. Of course, the matrix may be expanded to provide a larger number of inputs and outputs. If, for example, a 16 by 16 matrix is used, then a 64-bit control word divided into 16 by 4 bit groups would be used. The control memory 20 may be any memory well known in the art and, for an 8 by 8 switching matrix, capable of storing and parallel accessing 24-bit digit words. Shift registers or any random access memory (RAM) are suitable for this purpose.

The chips $A_1$ and $A_2$ form an on-line/standby pair, each being fully equipped to drive the decode/driver chips $B_1$ and $B_2$. When chip $A_1$ is on-line, its memory contains the data pattern currently being used to control the switching matrix, while chip $A_2$ is available on-line for reprogramming to implement the next data traffic change. It is also possible to program chips $A_1$ and $A_2$ with the same traffic pattern, in which case, chip $A_2$ is able to act as a constant self-check of the functioning of chip $A_1$ and to flag the earth stations should any inconsistencies occur. Similarly, chip A₂ can be on-line and chip A₁ off-line receiving reprogramming information.

A highly stable crystal oscillator 24 in conjunction with a time base generator 26, comprised of digital divider circuits, provide a central timing reference for the communications systems. This internal clock provides the synchronization signals for the earth stations and controls the timing of the satellite switching matrix.

The decode/driver chips B₁ and B₂ are comprised of line decoders 28, static control units 30 and latches 32. The two chips B₁ and B₂ are both on-line in direct parallel operation, each driving 32 of the 64 matrix crosspoints. That is, each chip B is comprised of four decoders 28, four static control units 30 and four latches, with each decoder, static control unit and latch combination controlling the eight switching crosspoints of a shelf.

During dynamic operation, at the start of each frame, data is output from the on-line control memory 20 at the rate of one 24-bit word for each frame unit. A holding register, now shown, may be used to temporarily store the control words. The readout control word is parallel accessed in eight groups of 3 bits each by the decoders 28. The outputs of the 1 out of 8 decoders 28 are connected to their respective shelves of the microwave switching matrix through a static control unit 30, latch 32 and conventional drive units (not shown) to render one of the switching crosspoints of the decoder associated shelf conductive. In this manner, the input to each of the eight shelves of the 8 by 8 matrix array is connected to one of the eight outputs of the matrix. Once a crosspoint switching element has been rendered conductive, it remains conductive for the duration of the frame unit. At the start of the next frame unit, a new control word is read from the control memory 20 and the process is repeated. In the dynamic mode of system operation, the on-line control memory 20 outputs 124 24-bit data words, one every frame unit, during each frame. A special control word is outputted from the memory 20 during the last frame unit reserved for transmission of earth station synchronization signals. At the end of the last frame unit, the control memory repeats its readout of 124 24-bit control words. This process is repeated continuously during dynamic system operation.

During dynamic operation of the system thus far described, only one crosspoint per row can be rendered conductive at any point in time. This precludes broadcast operation. According to the invention, the basic decoder/driver chips B₁ and B₂ are modified to provide static, point-to-multipoint control thus allowing any number of crosspoints on a shelf to be rendered simultaneously conductive. The term static control is used to distinguish from dynamic control during which crosspoint switching occurs once per frame unit. In static mode control, the crosspoints are switched at an appreciably slower rate, e.g., once a week as opposed to once every 6 microseconds. It should be noted that the DCU of the invention permits dynamic as well as static operation, with point-to-multipoint operation available only in the static mode. Both modes of operation can occur simultaneously with proper signal routing being assured by using frequency diversity on the uplink and downlink signals. For example, let it be considered that the crosspoints associated with columns 1, 3 and 5 of a shelf are rendered statically conductive while crosspoint 6 is dynamically conductive. While the dynamic input signal to the shelf will pass through each of the conductive crosspoints of column 1, 3, 5 and 6, and thereafter to spot beams associated with these crosspoints, the earth stations illuminated by the spot beams associated with crosspoints 1, 3 and 5 will reject the "dynamic" signal because it will be on an unwanted frequency.

FIG. 3 illustrates the details of the static control unit 30. All of these units are identical and therefore only one unit 30 is illustrated in detail. It is to be understood that each chip B contains four such units when the DCU controls an 8 by 8 matrix. The number of units will, of course, depend upon the matrix size. For a 16 by 16 matrix, there would be a total of 16 static control units. The static control unit operates to selectively override the dynamic control on a crosspoint-by-crosspoint basis in response to ground commands. Each static control unit 30 is comprised of a shift register, data latches and gating logic. The shift register 32 is comprised of N stages corresponding in number to the number of crosspoints in the shelves of the microwave switching matrix. Thus, for an 8 by 8 matrix, each of the 8 shelves is provided with an 8 stage shift register. The shift register is loaded with a static control word comprised of static junction control bits. The static junction control bits are parallel output from the shift register 32 to the data latches 34, one data latch being associated with each stage of the shift register. The set or logic 1 output from these data latches are applied as one input to respective OR gates 36. A second input to each of the OR gates is derived from the decoder 28 outputs. The output of each OR gate determines the logic state of an associated decoder latch 38. The outputs from the latches 38 control the conductive states of the crosspoint switching elements dedicated to each of the decoder latches. Thus, the static junction control bits dictate the conductive states of their corresponding switching elements.

Dynamic operation of the DCU is identical to prior art DCU operations, as described in the above-mentioned Schmidt et al U.S. Pat. No. 3,928,804, except that the output from each decoder 28 passes through a static control unit OR gate 36 instead of being directly applied to a decoder latch 38. For static operation, each static control unit shift register 32 is loaded, in response to ground generated commands, with a static control word designating the particular shelf crosspoints to be rendered statically conductive. A logic 1 signifies that the corresponding crosspoint is to be rendered conductive. For example, a logic 1 in a stage of a shift register 32 causes a corresponding data latch 34 to be set and a logic 1 to appear at the output of OR gate 36, thereby setting the decoder latch 38 rendering the crosspoint diode associated with the designated shift register stage conductive. So long as the logic 1 remains in the shift register stage the switching element controlled by that register stage remains conductive without regard to the output from the decoder 28.

As mentioned previously, a separate static control unit 30 is provided for each shelf and thus there is one such unit for each decoder. This permits any number of crosspoints in each of the shelves to be simultaneously conductive. In fact, all or any number of crosspoints in a shelf can be made simultaneously conductive.

According to the invention, SS-TDMA satellites are configured to allow point-to-point dynamic TDMA operation as well as point-to-multipoint static FDMA operation. During static mode operation, matrix crosspoint switching is controlled by a static control word comprised of a number of bits at least equal to the number of crosspoint switching elements to be selectively switched thereby permitting the simultaneous switching of any number of switching elements. This dual mode capability has specific application to and facilitate the transition period during which there will be a gradual changeover from FM/FDMA to SS-TDMA operation of communication satellites.

What is claimed is:

1. In a communications satellite system of the space division type including spot beam antennas receiving uplink communications signals from a plurality of earth stations and transmitting said uplink signals over downlinks to said earth stations, said uplinks being communicated to said downlinks through a switching matrix forming an array of inputs and outputs interconnected in a row and column fashion through electrically controllable crosspoint switching elements, each uplink being designated to a different matrix input and each downlink to a different matrix output, and a distribution control unit for controlling the conductive states of said crosspoint switching elements, the improvement comprising:

(a) means associated with said distribution control unit for generating digital control words, each bit position of said words functioning to control the conductive state of a different crosspoint switching element, and (b) means responsive to said digital control words for selectively and simultaneously rendering any number of said crosspoint switching elements conductive to thereby effect point-to-multipoint interconnection between the matrix inputs and outputs.

2. The satellite system of claim 1 wherein said satellite system is operable in a time division mode with uplinks communicating with downlinks in a cyclical fashion, a complete cycle occurring over a frame time, each frame being subdivided into frame units, said distribution control unit including means for dynamically varying the conductive states of said crosspoint switching elements such that a different connection pattern can occur each frame unit.

3. The satellite system of claim 2 wherein said means for generating a digital control word comprises a shift register and said means responsive to said digital control words comprises a latch circuit.

* * * * *